US007173530B2

(12) United States Patent
Lambright et al.

(10) Patent No.: US 7,173,530 B2
(45) Date of Patent: Feb. 6, 2007

(54) NESTED VISIBILITY FOR A CONTAINER HIERARCHY

(75) Inventors: Stephen J. Lambright, San Francisco, CA (US); Blair B. LaCorte, Belvedere, CA (US); Ravindra U. Rajapakse, San Francisco, CA (US); David L. Shannon, State College, PA (US); Leo S. Chang, San Carlos, CA (US)

(73) Assignee: Savi Technology, Inc., Sunnyvale, CA (US)

( * ) Notice: Subject to any disclaimer, the term of this patent is extended or adjusted under 35 U.S.C. 154(b) by 0 days.

(21) Appl. No.: 10/841,368

(22) Filed: May 6, 2004

(65) Prior Publication Data

US 2005/0024200 A1  Feb. 3, 2005

Related U.S. Application Data

(63) Continuation-in-part of application No. 10/821,296, filed on Apr. 8, 2004.

(60) Provisional application No. 60/528,334, filed on Dec. 9, 2003, provisional application No. 60/514,968, filed on Oct. 27, 2003, provisional application No. 60/470,294, filed on May 13, 2003, provisional application No. 60/468,929, filed on May 7, 2003, provisional application No. 60/468,930, filed on May 7, 2003, provisional application No. 60/461,946, filed on Apr. 9, 2003.

(51) Int. Cl.
*G08B 13/14* (2006.01)

(52) U.S. Cl. .................. 340/572.8; 340/572.1; 340/10.1; 340/10.33; 340/5.92; 340/825.49; 235/385

(58) Field of Classification Search ............. 340/572.1, 340/539.1, 539.13; 700/7, 103 X, 205
See application file for complete search history.

(56) References Cited

U.S. PATENT DOCUMENTS

| 4,688,244 | A | | 8/1987 | Hannon et al. |
| 4,750,197 | A | | 6/1988 | Denekamp et al. |
| 5,565,858 | A | | 10/1996 | Guthrie |
| 5,835,012 | A | | 11/1998 | Wilk |
| 5,892,441 | A | | 4/1999 | Woolley et al. |
| 5,959,568 | A | * | 9/1999 | Woolley ...................... 342/42 |
| 6,148,291 | A | | 11/2000 | Radican |

(Continued)

OTHER PUBLICATIONS

Notification Of The International Search Report Or The Declaration and Written Opinion Of The International Searching Authority, PCT/US04/14206, Apr. 28, 2005, 9 pages.

(Continued)

*Primary Examiner*—Julie Bichngoc Lieu
(74) *Attorney, Agent, or Firm*—Fenwick & West LLP

(57) ABSTRACT

A nested container establishes a relative hierarchy of associated containers as logistical units. The relative hierarchy comprises lower-layer containers and upper-layer containers relative to the nested container. To do so, the nested container sends interrogation signals to neighboring containers in order to retrieve identification information and layer information. Also, the nested container sends its own information identification information and layer information responsive to received interrogation signals. The nested container outputs the relative hierarchy to, for example, a site server or agent using a hand-held device. The identification module comprises, for example, an RFID (Radio Frequency IDentification) device.

27 Claims, 7 Drawing Sheets

U.S. PATENT DOCUMENTS

| | | |
|---|---|---|
| 6,211,781 B1 | 4/2001 | McDonald |
| 6,662,068 B1 | 12/2003 | Ghaffari |
| 6,714,121 B1 | 3/2004 | Moore |
| 6,804,578 B1 | 10/2004 | Ghaffari |
| 6,820,805 B2 | 11/2004 | Stevens |
| 6,927,687 B2 | 8/2005 | Carrender |
| 2001/0018672 A1 | 8/2001 | Petters et al. |
| 2002/0029178 A1 | 3/2002 | Wiederin et al. |
| 2003/0125980 A1 | 7/2003 | Ribeiro |
| 2003/0227382 A1 | 12/2003 | Breed |
| 2004/0100379 A1 | 5/2004 | Boman et al. |
| 2004/0153344 A1 | 8/2004 | Bul et al. |
| 2005/0109845 A1 | 5/2005 | Ghaffari |
| 2005/0110636 A1 | 5/2005 | Ghaffari |
| 2005/0288937 A1 | 12/2005 | Verdiramo |

OTHER PUBLICATIONS

International Search Report and the Written Opinion, PCT/US04/15166, Sep. 6, 2005, 6 pages.

International Search Report and the Written Opinion, PCT/US04/41501, Nov. 3, 2005, 11 pages.

"Guidance from AIM Global's RFID Expert Group: Proposed Guidelines for the Use of RFID-Enabled Labels in Military Logistics: Recommendations for Revision of MIL-STD-129," AIM Global, May 13, 2005, 39 pages.

"RFID Product Requirements for the Savi Total Asset Visibility Portable Deployment Kit," 2004, Savi Technology, Inc., 25 pages.

"Savi® Portable Deployment Kit," Active RFID Technology, Savi Technology, 1 page.

Notification of Transmittal of the International Search Report and the Written Opinion, PCT/US04/14192, Jan. 18, 2006, 8 pages.

Notification of the International Search Report and Written Opinion, PCT/US04/11086, Sep. 5, 2006, 10 pages.

* cited by examiner

NESTED VISIBILITY FOR A CONTAINER HIERARCHY

CROSS-REFERENCE TO RELATED APPLICATIONS

This application: claims priority under 35 U.S.C. § 119(e) to U.S. Patent Application No. 60/468,930, filed on May 7, 2003, entitled "Concepts for Smart Container," by Stephen Lambright et al.; claims priority under 35 U.S.C. § 119(e) to U.S. patent application No. 60/468,929 filed on May 7, 2003, entitled "Concepts for Nested Visibility of Logistics Units," by Stephen Lambright et al.; claims priority under 35 U.S.C. § 119(e) to U.S. Patent Application No. 60/528,334, filed on Dec. 9, 2003, entitled "Concepts for Nested Visibility of Logistics Units," by Stephen Lambright et al.; claims priority under 35 U.S.C. § 120 as a continuation-in-part to U.S. patent application Ser. No. 10/821,296, filed on Apr. 8, 2004, entitled "Continuous Security State Tracking for Intermodal Containers Through a Global Supply Chain," by David Shannon et al., which claims priority under 35 U.S.C. § 119(e) to U.S. Provisional Patent Application No. 60/461,946, filed on Apr. 9, 2003, entitled "Method and Apparatus for Managing, Securing, and Tracking Intermodal Containers Through the Global Supply Chain," by David Shannon, U.S. Provisional Patent Application No. 60/470,294, filed on May 13, 2003, entitled "Global Supply Chain Federation," by David Shannon, and U.S. Provisional Patent Application No. 60/514,968, filed on Oct. 27, 2003, entitled "Mechanisms for Secure RF Tags on Containers," by Ravi Rajapakse et al.; and is related to U.S. patent application Ser. No. 10/841,407, filed May 6, 2004, entitled "State Monitoring of a Container," by Stephen Lambright et al., the entire contents of each being herein incorporated by reference.

BACKGROUND OF THE INVENTION

1. Field of the Invention

This invention relates generally to tracking containers and their contents and, more specifically, to providing item-layer visibility and verifying manifest information by interrogating one layer within a logistical hierarchy of multiple heterogeneous layers of containers.

2. Description of Related Art

Ever-increasing global trade underscores a modem global economy which depends on goods transported in a global supply chain. Generally, a global supply chain is a network of international suppliers, manufacturers, distributors, and other entities that handle goods from their component parts to consumer consumption. For example, semiconductor testing equipment is exported from the United States to Taiwan, where semiconductors are processed and then sent to Malaysia for assembly into computers. Subsequently, the computers are shipped to warehouses in the United States, and ultimately, to consumer outlets for consumption.

However, current tracking systems have difficulty tracking container contents because goods are nested within several containers during shipping. For example, in terms of a nesting as defined by the ISO (International Standards Organization) item layers are packed into package layers, which are in turn stored in carton layers. Several carton layers are stored in a unit load layers, and several unit load layers are stored in container layers. Note that "container" is used here in a broader sense that includes each ISO layer and other enclosures. A vehicle transports several container layers at a time. Thus, an operator can only assume that an item is on a vehicle based on static nesting information collected during packing. Accordingly, if the good were stolen during shipment, or lost by being shipped to a wrong location, it is not possible to discover the missing good until each layer of container is opened at a consignee.

A related problem is that current tracking systems have no real-time information for tracking container contents, especially at the item-layer. Because physical contents travel separately from data about the contents, the tracking system is not able to provide dynamically verified information about contents. A port operator needing to know the contents of the container must log-in to the tracking system to retrieve static information. Moreover, the data about contents is often delayed and, thus, the operator may not even be able to retrieve some information.

Additionally, many large consumer stores are requiring that products use RFID (Radio Frequency IDentification) tags in order to improve supply chain efficiency sufficient for just in time merchandise stocking. But these tags are typically heterogeneous and, thus not amicable to intra-tag communication. Thus, conventional tags wait until acted upon from a tag reader by passively outputting information to a centralized system. It is this centralized system that traditionally determines any relationship between goods.

Therefore, what is needed is a robust system providing nested visibility of a hierarchy of associated containers. The solution should further provide item-layer visibility and end-to-end tracking of goods within a global supply chain.

SUMMARY OF THE INVENTION

The present invention meets these needs with systems and methods to provide multi-layer visibility of nested containers. The systems can further provide a virtual warehouse enabled by item-layer visibility that tracks individual items end-to-end through a global supply chain. Thus, a central system can quickly and easily gather information about each of the associated containers having heterogeneous automatic identification technology by interrogating any one of the layers.

In some embodiments, a nested container comprises a container with an identification device. The identification device acts as an agent by autonomously gathering and processing information for the central system. The identification device provides visibility through a variety of automatic identification technologies such as active or passive RFID (Radio Frequency IDentification) tags, bar codes, EPC (Electronic Product Code) compliant tags, or any other devices capable of communicating its identification information. By automatically sending hierarchy information to the central system at, for example, checkpoints in a global supply chain, or in between checkpoints, with a satellite, the identification device provides item-layer visibility. In one embodiment, the nested container automatically verifies AMR (Automated Manifest Rule) information by downloading from the central system and comparing to visible items.

In some embodiments, the identification device comprises an association module. The association module establishes a relative hierarchy of lower-layer containers, down to the item-layer, and upper-layer containers. Example layers include an item layer, a unit load layer, an intermodal container layer, and the like. To establish the hierarchy, the association module sends interrogation signals to neighboring containers in order to retrieve identification information and layer information. The information can relate to both individual information of the responding container and hierarchical information about neighbors to the responding container. Also, the association module sends its own identification information and layer information responsive to received interrogation signals. From a nested container, the association module outputs the relative hierarchy to, for example, a site server or agent using a hand-held device.

In some embodiments, the identification device further comprises a communication port to send and receive identification and/or layer information. The communication port comprises, for example, an RFID transceiver operating at a 433-Mhz frequency.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTIONS OF THE PREFERRED EMBODIMENTS

A system and method for nested visibility are disclosed. The system according to some embodiments of the present invention is set forth in FIGS. 1–4, and methods operating therein, according to some embodiments of the present invention, are set forth in FIGS. 5–6.

The accompanying description is for the purpose of providing a thorough explanation with numerous specific details. Of course, the field of cargo tracking is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. Accordingly, the present invention should not be understood as being limited to the specific implementations described below, but only by the claims that follow.

Figure 1:
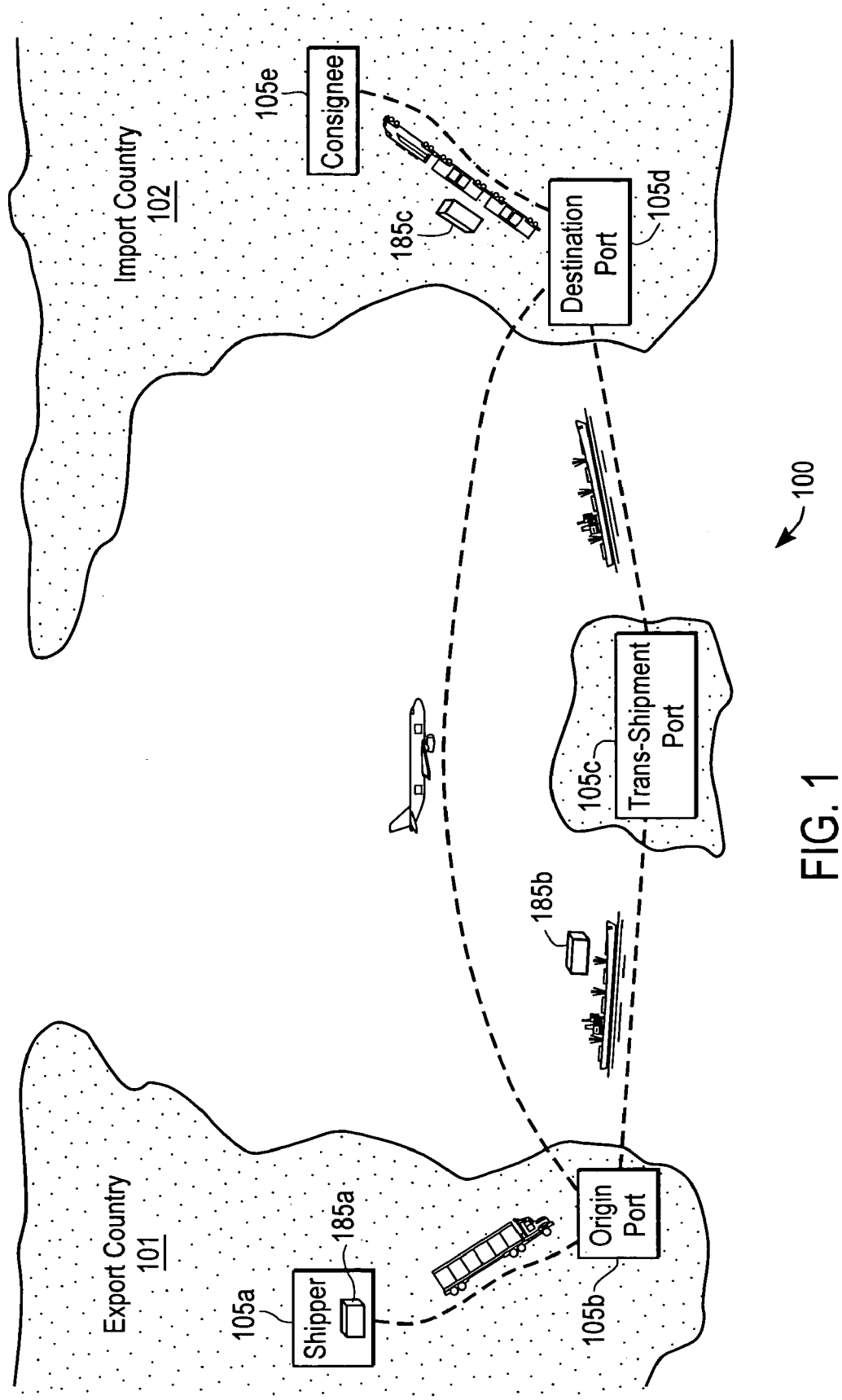
FIG. 1 is a schematic diagram illustrating an exemplary global supply chain according to one embodiment of the present invention.

The processes, features, or functions of the present invention can be implemented by program instructions that execute in an appropriate computing device. Example computing devices include electronic tags, enterprise servers, application servers, workstations, personal computers, network computers, network appliances, personal digital assistants, game consoles, televisions, set-top boxes, premises automation equipment, point-of-sale terminals, automobiles, and personal communications devices. The program instructions can be distributed on a computer readable medium, storage volume, or the Internet. Program instructions can be in any appropriate form, such as source code, object code, or scripting code FIG. 1 is a schematic diagram illustrating an exemplary global supply chain 100 including nested containers 185 according to one embodiment of the present invention. Note that FIG. 1 is merely an example global supply chain 100 that can have various geographical configurations, modes of transport, etc. within the scope and spirit of the present invention. The global supply chain 100 comprises a shipper 105a, an origin port 105b, a transshipment port 105c, a destination port 105d, and a consignee 105e.

The global supply chain 100 is used by a network of international suppliers, manufacturers, distributors, and other entities that handle goods from their component parts to consumer consumption. Accordingly, nested containers 185 and other cargo pass through the network points, checkpoints, ports, etc. The shipper 105a and the consignee 105e can be direct or indirect partner entities or units within a single entity exchanging a container though a trade route. For example, a manufacturer sends computer components to an assembly plant by truck freight, which in turn ships assembled computers to a warehouse. The origin and destination ports 105b–c can be a shipping dock, an airport, a customs agency, an NVOCC (Non-Vessel Operating Common Carrier) or any other entity that sends and/or receives goods over a trade route. An internal supply chain is a similar network operated by a single entity or closely-associated entities At a high-level, the shipper 105a can transport a nested container 185 to the consignee 105e via one of many trade routes. As a first mode of transportation, a truck transports the nested container 185 from the shipper 105a to the origin port 105b. As a second and a third mode of transportation, a first vessel and a second vessel transport the nested container 185 from the origin port 105b to the destination port 105d with a transfer at a transshipment port 105c. As a fourth mode of transportation, a freight train transports the container to the consignee 105e. In the case of international transportation, governmental agencies of the corresponding countries 101, 102, such as a Customs and National Security Agencies, exercise oversight over components of the primary network while private parties exercise oversight over components of the extended network. Note that, however, in one embodiment, the transportation occurs within the borders of a single country. As such, exporting and importing is between intranational geographical locations (e.g., between two states, cities, provinces, etc.) overseen by, for example, a security agency or an intranational governmental agency. Problematically, checkpoints cannot easily gather information about typical containers having other containers layered therein.

The nested container 185 addresses this visibility problem. The nested container 185 acts as an agent by autonomously gathering and processing information for presentation to the central system. The nested container 185 associates itself with neighboring containers to form a relative hierarchy of logistical units. The relative hierarchy accounts for containers of higher layers and containers of lower layers. Preferably, a nested container 185 at the highest layer outputs the relative hierarchy in response to interrogations, however, any layer can do so. In one embodiment, the nested container 185 enables a master status upon determination that it is at the highest layer. In another embodiment, the nested container 185 updates the relative hierarchy upon detecting changes in composition (e.g., when a previously nested container fails to respond to a periodic poll).

As used herein, "layers" within the hierarchy can be defined in a variety of ways. Generally, each layer is capable of identifying itself in response to an interrogation, and is defined relative to other layers. A lower layer is capable of being contained within a higher layer. For example, an item or good at a first layer is contained within its packaging at a second layer, and a packaging is contained within a carton of layer three. A spectrum of layers can extend from an item and at the lowest layer to a vehicle at the highest layer. Preferably, less capable automatic identification technologies, such as bar codes, are within lower layers, and more capable automatic identification technologies, such as active RFID (Radio Frequency IDentification) tags, are within higher layers. In one embodiment, the nested container 185 comprises a smart container as described in U.S. patent application Ser. No. 10/841,407.

As the nested container 185 travels on its route through the global supply chain 100, it may be interrogated at different checkpoints. When a truck is unloaded at the origin port 105b, pallets that were once associated can become separated and possibly reassociated. Since the truck is no longer the highest layer of the hierarchy, the nested containers 185 of relatively lower layers are able to provide similar information to an interrogator. Further embodiments of nested containers 185 and methods operating therein are described in below.

Figure 2A:
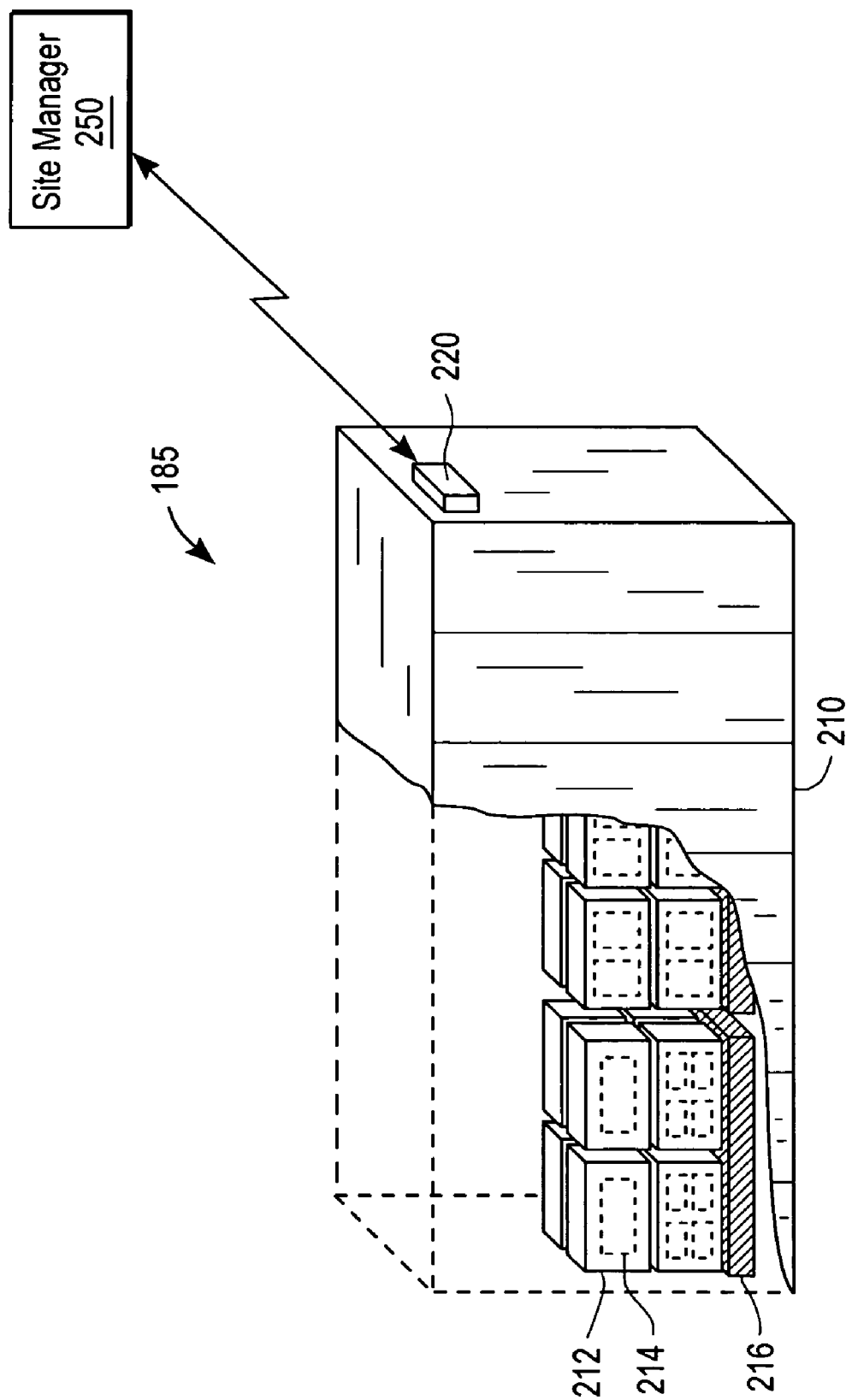
FIGS. 2A–C are schematic diagrams illustrating example physical layers within a container hierarchy according to some embodiments of the present invention.
Figure 2B:
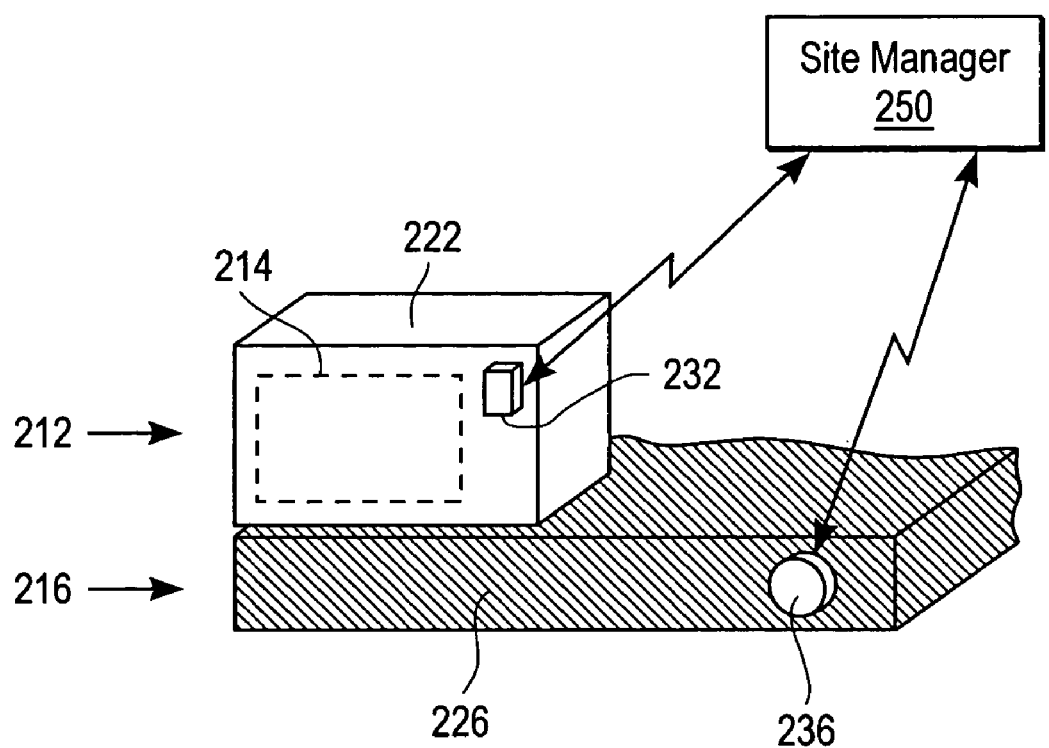
Figure 2C:
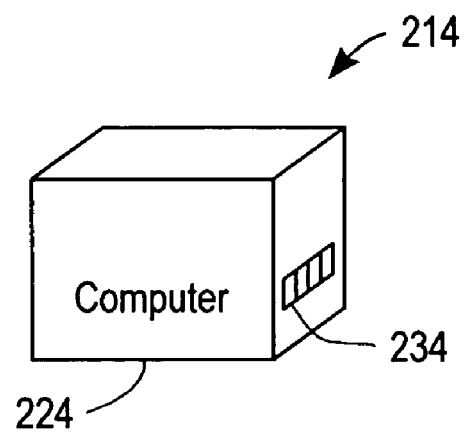

FIGS. 2A–C are schematic diagrams illustrating example physical layers within a container hierarchy according to some embodiments of the present invention. Accordingly, a nested container 185 at the highest layer comprises a container 210 with an identification device 220 as shown in FIG. 2A. The nested container contains a nested pallet 216 holding nested containers 212 with nested items 214. The identification device 220 is in communication (preferably wirelessly) with a site server 250. The site server 250 can be a local portion of a centralized system for security, tracking, and the like. The site server 250 can collect information about containers 185, 212, 214, and the nested pallet 216 for local analysis or uploading. The site server 250 can also write instructions and/or data to the nested containers 185, 212, 214 and the nested pallet 216.

FIG. 2B illustrates the nested container 212 at a lower layer comprising a container 222 with an identification device 232. The nested pallet 216 as shown in this embodiment, is a platform for a group of nested containers 212 that is useful during, for example, movement by a forklift. The nested pallet 216 comprises a pallet 226 and an identification device 236. Both identification devices 232, 236 are also in communication with the site server 250. Also, FIG. 2C illustrates the nested container 214 at a lower layer relative to the nested container 212 comprising an item 224 with a bar code 234 or other inexpensive identification device.

As used herein, "containers" can comprise common enclosures referred to as, for example, goods, items, packages, cargo, intermodal containers, freight, boxes, and the like. Containers can also comprise ISO (International Organization for Standardization) standardized enclosures in the form of layers or units referred to as, for example, IMCs (InterModal Container), IBCs (Intermediate Bulk Container), RTCs (Reusable Transport Container), ULDs (Unit Load Devices), the layers described below with respect to FIG. 4, and the like. Note that the containers 210, 222, 224 are merely examples as it can vary in size, shape, and configuration (e.g., more than two doors).

The identification devices 220, 232, 236 although at different layers, are each capable of independent communicate with the site server 250. Thus, the identification devices 220, 232 need not daisy chain information up a ladder as the site manager 250 can gather information from either source. In one embodiment, the identification devices 220, 232 automatically verify AMR (Automated Manifest Rule) information by downloading from the central system and comparing to visible items. As a result, the identification devices 220, 232 can verify AMR to a central security system, and inform an operator or agent as to whether correct goods are being loaded, unloaded, etc.

The identification devices 220, 232, 234 are coupled, attached, mounted, or otherwise associated with the containers 210, 222, 224 for identification. In one embodiment, the identification devices 220, 232, 234 although heterogeneous, are interoperable. For example, identification device 220 comprises an active RFID tag, identification device 232 comprises a passive RFID tag, and identification device 234 comprises a bar code. Other types of identification devices 220 not herein described, such as EPC (Electronic Product Code) tags can also be used in some embodiments. An example identification device 220 is described in further detail below with respect to FIG. 3.

Figure 3:
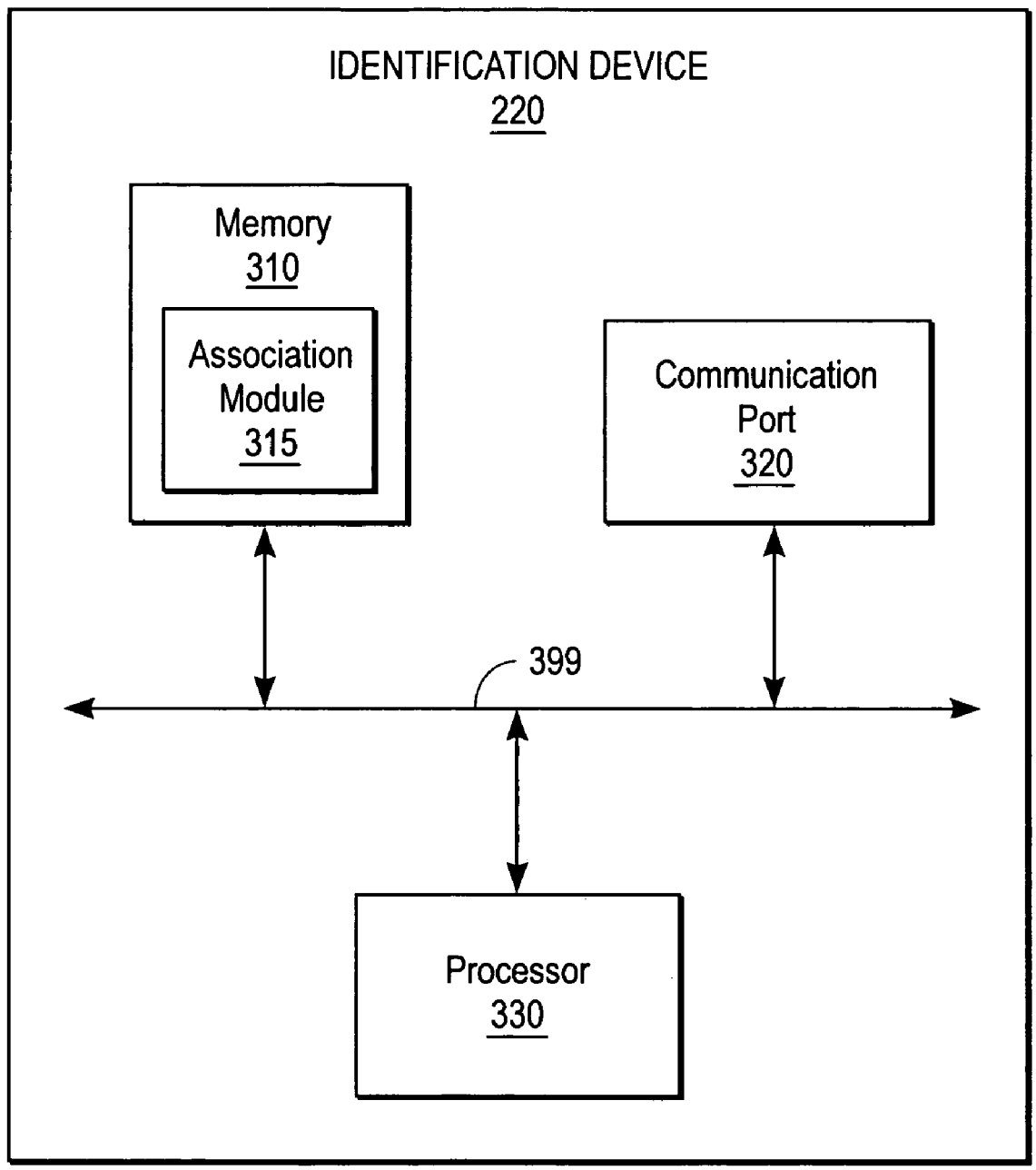
FIG. 3 is a block diagram illustrating an identification device according to one embodiment of the present invention.

FIG. 3 is a block diagram illustrating a representative identification device 220 according to one embodiment of the present invention. The identification device 220 comprises a memory 310, a communication port 320, and a processor 330, coupled in communication through a bus 399. The memory 310 can be any volatile or non-volatile device capable of storing program instructions and/or data. The memory 310 further comprises an association module 315. The association module 315 establishes the relative hierarchy of lower-layer containers and upper-layer containers. In operation, the association module 315 sends out an interrogation signal to identify associated nested containers 185. Subsequently, the association module 315 receives identification information and layer information. The identification information comprises, for example, a key that uniquely identifies the nested container 185. The layer information comprises, for example, explicit downloaded information, or implied information related to nested containers 185. The association module 315 uses the layer information to determine whether the nested container 185 is in the upper-layer or lower-layer and, further, a layer relative to other known nested containers 185. Additionally, the association module 315 responds to interrogatories with identification information and layer information concerning the container 220.

The communication port 320 comprises physical, logical, analog and/or digital communication channels necessary to, for example, send and receive identification information, layer information, and the like. For example, if the identification device 220 comprises an RFID device, the communication port 320 comprises an RF transmitter and receiver. The processor 330 comprises, for example, a CPU (Central Processing Unit), a mobile CPU, a controller, or other device to execute instructions. The communication port 320 can also translate information between formats such as between a proprietary information format and EDI (Electronic Data Interchange). As can be seen, the configuration described in FIG. 3 is only an example, and can modified according to desired capabilities or container layer of the identification device 220.

Figure 4:
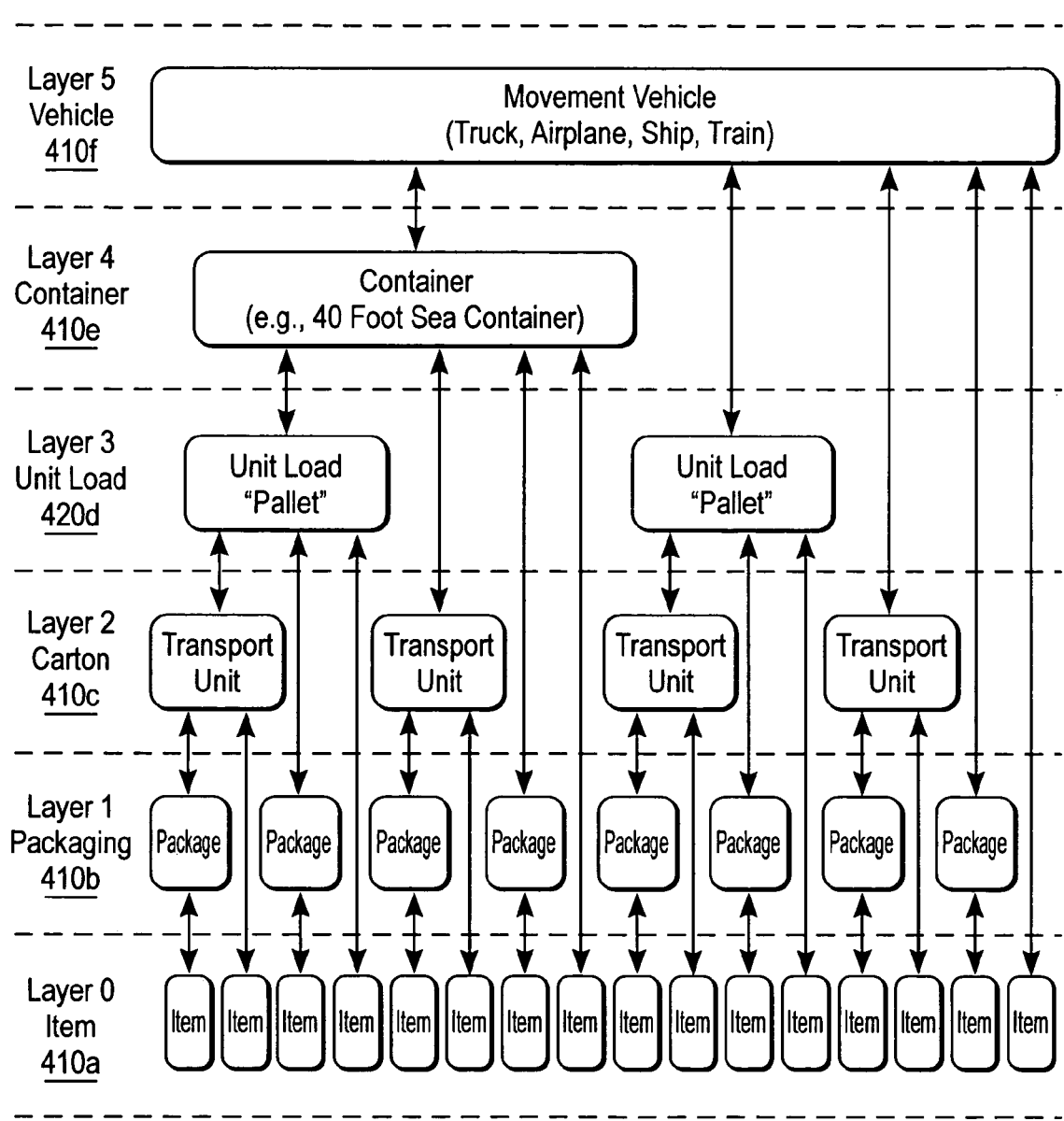
FIG. 4 is a block diagram illustrating ISO logistical layers within an example container hierarchy according to one embodiment of the present invention.

FIG. 4 is a block diagram illustrating ISO logistical layers within an example container hierarchy according to one embodiment of the present invention. The logistical layers or units include an item layer 410a, a packaging layer 410b, a carton layer 410c, a unit load layer 410d, a container layer 410e (not meant to redefine "container" as used herein), and a vehicle layer 410f. As shown in FIG. 4, each layer is capable of communicating identification information and layer information to each other layer in a many-to-many relationship to establish relative hierarchies. In one embodiment, layer information pertains to which logistical layer the nested container 185 belongs. In another embodiment, the container hierarchy uses non-ISO layers.

The item layer 410a comprises, for example, an item or good such as a computer with a serial number. The item can have a serial number or passive tag. The packaging layer 410b comprises, for example, a box used to enclose the item and its accessories. The packaging can have a bar code, UPC code, passive tag, or the like. The unit load layer 410c comprises, for example, one or more packages that are moved around together on a pallet. The unit layer 410d can have an active or passive tag. The container comprises, for example, a 40'×8'×8+ metal box of one or more pallets. The container can have an internally or externally mounted active or passive tag. The vehicle layer 410e comprises, for example, one or more containers. The vehicle can have an active or passive tag.

Figure 5:
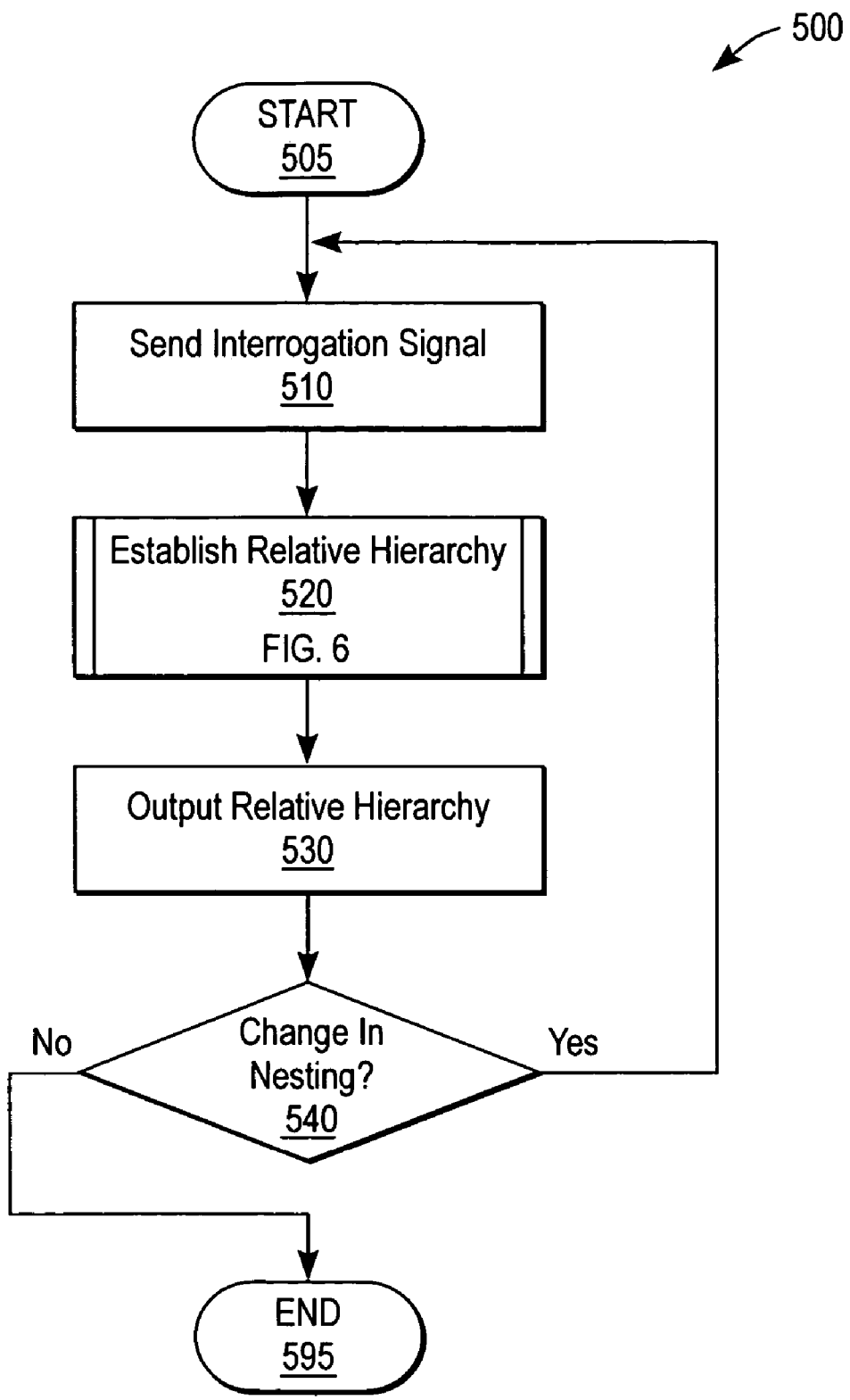
FIG. 5 is a flow chart illustrating a method for providing nested visibility according to one embodiment of the present invention.

FIG. 5 is a flow chart illustrating a method 500 for providing nested visibility according to one embodiment of the present invention. The communication port 320 sends 510 an interrogation signal at the direction of the association module 315. The interrogation signal invokes a response of identification and layer information through its identification device 220, or automatic identification technology. In one embodiment, the interrogation signal also includes identification and layer information of the requestor.

The association module 315 establishes 520 a relative hierarchy as discussed further below with respect to FIG. 6. The relative hierarchy based on responses to the interrogation signal provides visibility from that layer. Thus, an interrogator of the identification device 220 can gather information about the nested container 185 and its associated containers from a single device interaction.

The communication port outputs 530 the relative hierarchy. The output can be in response to a regular communication with a reader, a specific interrogation signal, or due to a periodic publication to subscribers. The output may be to a site server 250, to an agent with a hand-held device, and the like. If there is a change in nesting 540, the communication module 320 repeats the process by sending 510 another interrogation signal.

Figure 6:
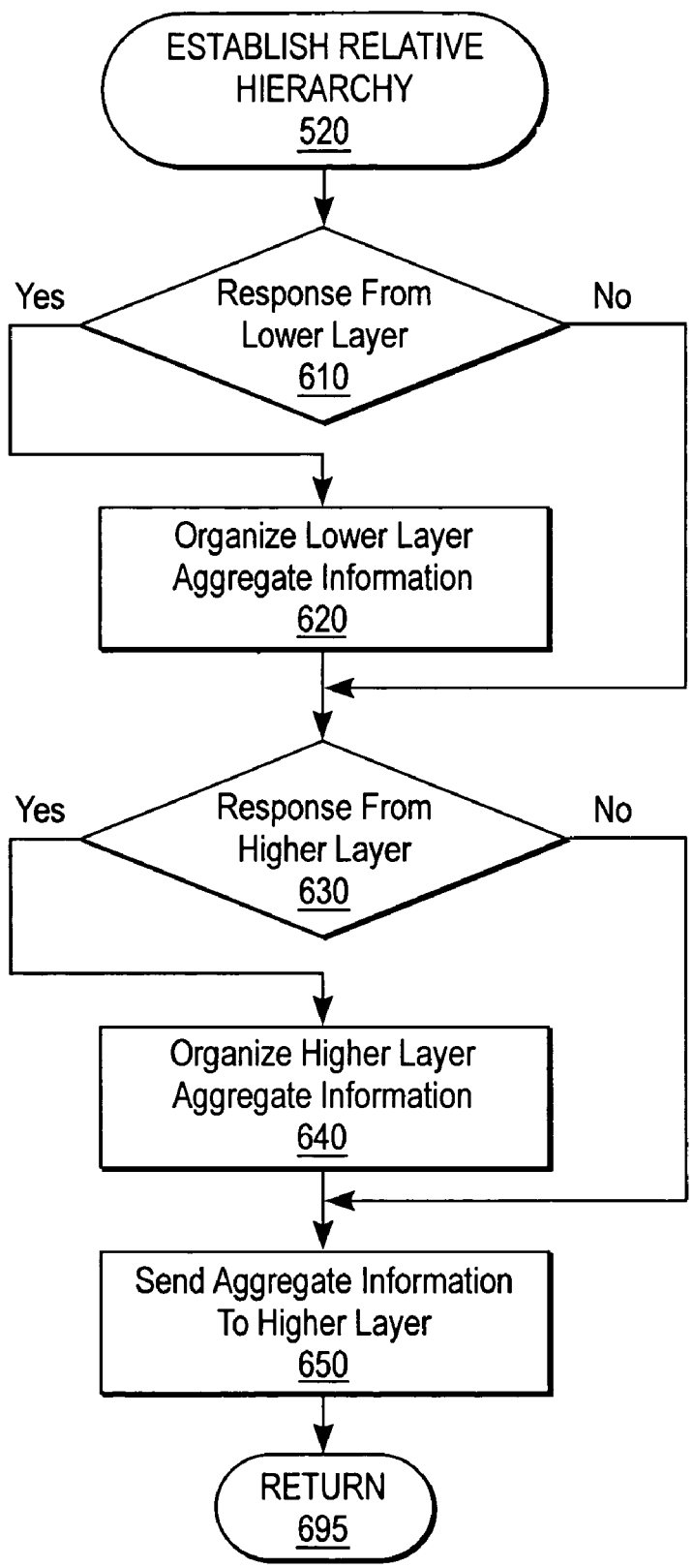
FIG. 6 is a flow chart illustrating a method for establishing the relative hierarchy according to one embodiment of the present invention.

FIG. 6 is a flow chart illustrating the method 520 for establishing the relative hierarchy according to one embodiment of the present invention. The relative hierarchy is based on responses from neighboring nested containers 185. In one embodiment, association information can be preloaded at a checkpoint in the global supply chain 100. If the association module 315 receives responses from lower-layer containers 610, it organizes 610 these containers into lower-layer aggregate information. The aggregate information can comprise several layers to delineate a sub-hierarchy.

Likewise, if the association module 315 receives responses from higher-layer containers 630, it also organizes 640 these containers into higher-layer aggregate information comprising several layers and a sub-hierarchy. In one embodiment, the association module 315 sends 650 aggregated information to known higher-layer containers. The association module 315 may also keep information about peer hierarchies that respond to the interrogation signal.

Because a many-to-many relationship exists among layers, some information can be duplicitous. Thus, the association module 315 of one embodiment recognizes and removes duplicitous material. The association module 315 of another embodiment uses duplicitous information for verification or reliability scoring. In one embodiment, the association module 315 resolves conflicting information through various methods such as using the highest-layer information, or using the directly obtained information.

We claim:

1. In an associated container within a plurality of nested containers, each nested container having automatic identification technology, a method for tracking the plurality of nested containers, comprising the steps of:
   receiving identification information and layer information from at least one of the plurality of nested containers; and
   establishing a relative hierarchy within the plurality of nested containers based on the identification information and the layer information, the relative hierarchy being capable of including one or more lower-layer containers and one or more upper-layer containers.

2. The method of claim 1, wherein nested containers at different layers of the relative hierarchy are capable of establishing the relative hierarchy.

3. The method of claim 1, further comprising:
   providing item-layer visibility by including items in the relative hierarchy.

4. The method of claim 1, wherein the plurality of containers comprise heterogeneous automatic identification technologies to send the identification information and the layer information.

5. The method of claim 1, further comprising:
   receiving relative hierarchy information from at least one of the plurality of nested containers.

6. The method of claim 1, further comprising:
   sending an interrogation signal to at least one of the plurality of nested containers.

7. The method of claim 1, further comprising:
   outputting the relative hierarchy.

8. The method of claim 1, further comprising:
   outputting the relative hierarchy responsive to a query by a tracking system.

9. The method of claim 1, further comprising:
   wherein the plurality of nested containers comprises one or more from the group containing: an item, a package, a carton, a unit load, a container, and a vehicle.

10. An associated container within a plurality of nested containers, each nested container having automatic identification technology, comprising:
    an input to receive identification information and layer information from at least one of the plurality of nested containers; and an association module to establish a relative hierarchy within the plurality of nested containers based on the identification information and the layer information, the relative hierarchy being capable of including one or more lower-layer containers and one or more upper-layer containers.

11. The container of claim 10, wherein nested containers at different layers of the relative hierarchy are capable of establishing the relative hierarchy.

12. The container of claim 10, further wherein the association module provides item-layer visibility by including items in the relative hierarchy.

13. The container of claim 10, wherein the plurality of containers comprises heterogeneous automatic identification technology to send the identification information and the layer information.

14. The container of claim 10, wherein the input receives relative hierarchy information from at least one of the plurality of nested containers.

15. The container of claim 10, wherein the input sends an interrogation signal to at least one of the plurality of nested containers.

16. The container of claim 10, further comprising an output to send the relative hierarchy.

17. The container of claim 10, further comprising an output to send the relative hierarchy responsive to a query by a tracking system.

18. The container of claim 10, wherein the plurality of nested containers comprises one or more from the group containing: an item, a package, a carton, a unit load, a container, and a vehicle.

19. A computer product, having a computer-readable medium having computer program instructions embodied thereon capable of causing a computer to perform a method for tracking a plurality of nested containers, the method comprising:
  receiving identification information and layer information from at least one of the plurality of nested containers; and
  establishing a relative hierarchy within the plurality of nested containers based on the identification information and the layer information, the relative hierarchy being capable of including one or more lower-layer containers and one or more upper-layer containers.

20. The computer product of claim 19, wherein nested containers at different layers of the relative hierarchy are capable of establishing the relative hierarchy.

21. The computer product of claim 19, wherein the method further comprises:
  providing item-layer visibility by including items in the relative hierarchy.

22. The computer product of claim 19, wherein the plurality of containers comprise heterogeneous automatic identification technologies to send the identification information and the layer information.

23. The computer product of claim 19, wherein the method further comprises:
  receiving relative hierarchy information from at least one of the plurality of nested containers.

24. The computer product of claim 19, wherein the method further comprises:
  sending an interrogation signal to at least one of the plurality of nested containers.

25. The computer product of claim 19, wherein the method further comprises:
  outputting the relative hierarchy.

26. The computer product of claim 19, wherein the method further comprises:
  outputting the relative hierarchy responsive to a query by a tracking system.

27. The computer product of claim 19, wherein the plurality of nested containers comprises one or more from the group containing: an item, a package, a carton, a unit load, a container, and a vehicle.

* * * * *